(12) United States Patent
Barsade et al.

(10) Patent No.: US 10,332,216 B2
(45) Date of Patent: Jun. 25, 2019

(54) STREAMLINED SALES TAX RETURN PREPARATION

(71) Applicant: INTUIT INC., Mountain View, CA (US)

(72) Inventors: Jonathan Barsade, Wynnewood, PA (US); Todd M. Suzanski, Miami, FL (US)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 13/891,661

(22) Filed: May 10, 2013

(65) Prior Publication Data

US 2014/0337189 A1 Nov. 13, 2014

(51) Int. Cl.
G06Q 40/00 (2012.01)

(52) U.S. Cl.
CPC ................. G06Q 40/123 (2013.12)

(58) Field of Classification Search
CPC ............. G06F 17/243; G06Q 40/123
USPC ................... 705/31, 36 T, 35–37
See application file for complete search history.

(56) References Cited

U.S. PATENT DOCUMENTS

| | | | |
|---|---|---|---|
| 5,734,887 A | 3/1998 | Kingberg et al. |
| 5,774,872 A | 6/1998 | Golden et al. |
| 5,799,283 A | 8/1998 | Francisco et al. |
| 5,878,400 A | 3/1999 | Carter, III |
| 6,108,712 A | 8/2000 | Hayes, Jr. |
| 6,311,165 B1 | 10/2001 | Coutts et al. |
| 6,810,410 B1 | 10/2004 | Durham |
| 6,885,860 B2 | 4/2005 | Bahl et al. |
| 6,993,502 B1 | 1/2006 | Gryglewicz et al. |
| 7,398,239 B2 | 7/2008 | Barsade et al. |
| 7,562,033 B2 | 7/2009 | Barsade et al. |
| 8,099,342 B1 | 1/2012 | Christian et al. |
| 8,135,620 B2 | 3/2012 | Barsade et al. |
| 8,224,734 B2 | 7/2012 | Barsade et al. |
| 8,332,274 B2 | 12/2012 | Nadler et al. |
| 8,626,634 B2 | 1/2014 | Barsade et al. |
| 8,700,504 B2 | 4/2014 | Barsade |
| 8,793,168 B2 | 7/2014 | Barsade et al. |

(Continued)

OTHER PUBLICATIONS

US 8,326,739 B1, 12/2012, Barsade et al. (withdrawn)

(Continued)

*Primary Examiner* — Hao Fu
(74) *Attorney, Agent, or Firm* — Patterson + Sheridan, LLP (57) ABSTRACT

A tool for assisting end-users to comply with complex sales tax compliance requirements by electronically preparing a tax return by dynamically creating and providing to each end-user a first data input page having input fields relating only to types and categories of tax for which each end-user's line of business is required to report while suppressing presentation to the end-user data fields which are related to tax types which are not required to be reported or collected for the end-user's line of business. Using the streamlined input page, the end-user only provides the relevant data values and avoids seeing or worrying about irrelevant input values. The tool then electronically prepares one or more tax return forms or data files, and optionally submits those to an electronic server corresponding to the tax authority for the appropriate jurisdiction(s) or produces a paper return.

20 Claims, 6 Drawing Sheets

(56) References Cited

U.S. PATENT DOCUMENTS

| | | | |
|---|---|---|---|
| 2002/0010665 | A1 | 1/2002 | Lefebvre et al. |
| 2002/0052792 | A1 | 5/2002 | Johnson |
| 2003/0041045 | A1 | 2/2003 | Sun |
| 2003/0055754 | A1 | 3/2003 | Sullivan |
| 2003/0065949 | A1 | 4/2003 | Le |
| 2003/0093320 | A1 | 5/2003 | Sullivan |
| 2003/0101112 | A1 | 5/2003 | Gallagher |
| 2003/0233296 | A1* | 12/2003 | Wagner .................... 705/31 |
| 2004/0030619 | A1 | 2/2004 | Stokes et al. |
| 2004/0049437 | A1 | 3/2004 | Brikman et al. |
| 2006/0085304 | A1* | 4/2006 | De Macedo et al. ........... 705/31 |
| 2008/0071653 | A1* | 3/2008 | Cirulli et al. .................. 705/34 |
| 2012/0036053 | A1* | 2/2012 | Miller .................... G06Q 40/02 705/31 |
| 2012/0109792 | A1* | 5/2012 | Eftekhari ................ G06F 21/31 705/31 |

OTHER PUBLICATIONS

Exactor System Sales Tax Compliance Service User Guide, Aug. 2010.*

Revenue; "Tax-Prep Software for Sales & Use Taxes"; retrieved on Mar. 6, 2013 from http://www.revenue.state.il.us/TaxProfessionals/ElectronicFiling/sales.htm.

Avatax; "End-to-End Sales Tax Automation"; retrieved from www.avalara.com.

Exactor; "Exactor System Sales Tax Compliance Service User Guide"; Published on Aug. 2010.

Exactor; "X-Cart Shopping Cart Exactor Sales Tax Compliance Plug-In: Installation & User Guide";Published on Apr. 2011.

Tax; "Sales Tax forms(Current Periods)"; retrieved on Mar. 6, 2013 from http://www.tax.ny.gov/forms/sales_cur_forms.htm.

Tax; "Sales tax e-file mandate for monthly sales tax filers"; retrieved on Mar. 6, 2013 from http://www.tax.ny.gov/bus/ads/webst809.htm.

Taxform; "New York State and Local Sales and Use Tax Return for Part-Quarterly (monthly) Filers". Form ST-809.

Tax; "Monthly filer forms(Form ST-809 series)"; retrieved on Mar. 6, 2013 from http://www.tax.ny.gov/forms/monthly_filer_forms_st809_series.htm.

Tax; "View videos and demos"; retrieved on Mar. 6, 2013 from http://www.tax.ny.gov/e-services/otc/demos/demo.htm.

Csgnetwork; "Sales Tax Calculator and De-Calculator"; retrieved on Apr. 12, 2013 from http://www.csgnetwork.com/salestaxcalc.html.

Serviceobjects; "Sales Tax Web Service"; retrieved on Mar. 6, 2013 from http://www.serviceobjects.com/sales-tax-calculator-api?kw=+sales +tax +software&zut=adwt.

Window; "Texas Sales & Use Tax Forms"; retrieved on Mar. 6, 2013 from http://www.window.state.tx.us/taxinfo/taxforms/01-forms.html.

Texastaxform; "Texas Sales and Use Tax Return"; retrieved from www.window.state.tx.us/webfile.

Texastaxform; "Worksheet for completing the Sales and Use Tax Return".

Texastaxform; "Texas Use Tax Form".

Vertex; "Sales Tax Returns Software Solutions"; retrieved on Mar. 13, 2013 from http://www.vertexinc.com/Solutions/Indirect/sales-tax-returns.asp.

Fisher, Mike B.; "Streamlining user interfaces, part 1", retrieved from http://completeusability/streamlining-user-interfaces-part-1/ on Feb. 6, 2014.

* cited by examiner

Fig. 1

1. Insert your monthly sales amounts

2. Confirm the taxes owing

3. Receive confirmation

STREAMLINED SALES TAX RETURN PREPARATION

FIELD OF THE INVENTION

This invention relates to systems and methods for preparing sales tax returns, especially for small businesses in jurisdictions where sales tax preparation is complex and complicated.

BACKGROUND OF THE INVENTION

Sales tax return and preparation can be quite complex in some jurisdictions and depending on the line of business (LOB) of an end-user, such as a merchant retailer. The types of taxes that need to be collected, the tax returns that need to be filed, and even the schedules and sections of those returns can vary greatly based on the types of products and services a business sells and the customers they serve. Many state and local taxing jurisdictions have special tax rules and rates for the sale of food, alcohol, tobacco, software, drugs, medical devices, accommodations, services, etc. The tax agencies require special forms and schedules to be filled out and filed to account for these items when reporting sales taxes.

For example, some retailers, but not all, may sell food, which may be taxed differently depending on whether the food is prepared and ready to consume, raw and requires food, and depending on its final usage (for consumption by a consumer or for resale by another business). Some retailers may sell accommodations, such as inns and bed-and-breakfast establishments, which may further include taxable and non-taxable elements of services (dry cleaning, mail processing, long distance telephone, etc.) as well as the possible taxable night of stay.

Depending on the jurisdiction, some items may require multiple taxes to be collected and submitted, such as convention or tourism taxes, environmental or recycling taxes, and concession fees (e.g. airport entrance, etc.). And, there can be a great number of different forms on which each of these taxes may be reported, as applicable. For example, the State of Texas currently lists the following forms as being related to state tax forms and applications, as illustrated in Table 1.

TABLE 1

Example Tax Return Forms for One Jurisdiction (Texas)

AP-201 Texas Application for Sales and Use Tax Permit and instructions
AP-215 Texas Online Tax Registration Signature Form
01-117 Texas Sales & Use Tax Return - Short Form
01-114 Texas Sales & Use Tax Return and instructions
01-115 Texas Sales & Use Tax Return Outlet Supplement
01-116 Texas Sales & Use Tax Return List Supplement
01-148 Texas Sales & Use Tax Return
Credits and Customs Broker Schedule
01-922 Instructions for Completing Texas Sales & Use Tax Return
01-922(S) Instrucciones para Llenar la Declaracón de
Impuestos Sobre las Ventas y Uso
01-118 Texas Sales & Use Tax Prepayment Report
01-142 Texas Off-Road, Heavy Duty Diesel Equipment Surcharge Return
01-143 Texas Fireworks Tax Return
01-156 Texas Use Tax Return - to report & pay tax on
items brought or delivered from outside the state into Texas
01-339 Texas Sales and Use Tax Resale
Certificate/Exemption Certification
01-339-S Certificado de Reventa para el
Impuesto Sobre las Ventas y Uso de
Texas/Certificado de Exención para el Impuesto Sobre las
Ventas y Uso de Texas TABLE 1-continued Example Tax Return Forms for One Jurisdiction (Texas)

AP-101 Texas Application for Direct Payment Permit
01-119 Texas Direct Payment Return
01-116-C Texas List Supplement - for Direct
Payment Permit Holders ONLY
01-149 Texas Direct Pay Tax Return Credits Schedule
01-919 Texas Direct Payment Exemption Certification
AP-168 Texas Application for Customs Broker License
01-152 Texas Customs Broker Report
01-153 Texas Customs Broker Report--Outlet Supplement
AP-153 Texas Application for Maquiladora Export Permit
01-126 Texas Maquiladora Return
01-374 Maquiladora Exemption Certificate
01-157 Texas Special Use Tax Report for Printers
01-907 Texas Aircraft Exemption Certification
Out-of-State Registration and Use
01-917 Statement of Occasional Sale
01-909 Border States Uniform Sale for Resale Certificate
00-213 Contribution to Texas Grant and Teach for Texas Loan Repayment
Assistance Programs
00-808 Assignment of Security for Texas Tax/Fee
01-790 2012 Worksheet for Completing the Sales and Use Tax
Return Forms 01-114, 01-115, and 01-116
01-797 2012 Worksheet for Completing the Sales and Use Tax
Return Form 01-117 Sales Tax Refund Instructions
00-985 Assignment of Right to Refund
01-136 Credit Memo Acceptance
01-137 Limited Power of Attorney
01-158 Refund Claim for Residential Use of Electricity for RV Parks and
Campground Facilities
01-911 Sample of Schedule to Support Refunds
01-124 Enterprise or Defense Readjustment Project Claim for Refund
01-144 Enterprise or Defense Readjustment Project Claim for
Refund for Projects Designated on or After Sep. 1, 2001
01-125 Enterprise or Defense Readjustment Project - Invoices or Contracts
Supplement Additionally, approximately twenty different sales and use tax rate charts are in effect in Texas, and this is just for Texas. Other states are similarly complex, and there can be additional forms for county and city jurisdictions, as well.

SUMMARY OF EXEMPLARY EMBODIMENTS OF THE INVENTION

Disclosed is a tool and process for assisting end-users to comply with complex sales tax compliance requirements by electronically preparing, and optionally filing a sales or use tax return by dynamically creating and providing to each end-user a first data input page having input fields relating only to tax type types for which each end-user's line of business is required to report while suppressing presentation to the end-user data fields which are related to tax types which are not required to be reported or collected for the end-user's line of business. Using the streamlined input page, the end-user only provides the relevant data values and avoids seeing or worrying about irrelevant input values. The tool then electronically prepares one or more electronic sales and use tax return forms or data files, and optionally submits those to an electronic server corresponding to the tax authority for the jurisdiction(s) or to another method of receipt of the tax authority in which the end-user operates a business enterprise.

A streamlined end-user interface may address preparation of a return, automatic filing of a return, remitting of tax payments, or a combination of preparation, filing and remitting, to one or multiple tax authorities. For example, in a particular state's jurisdiction, some merchants may need to electronically file (e-file) their sales tax under one account identification (ID) to the state, e-file their consumer use tax under a different account ID to the state, file a return to a contracted agency for collecting taxes for their county tax, file a return directly to a home rule city, while also making multiple separate payments for each of these filings. And, by "sales tax", we refer collectively to various types of taxes which are levied upon transactions, including but not limited to sales tax, Value Added Tax ("VAT"), and use tax.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

Discovery of an Opportunity, Unmet Need, and Unrecognized Problem. The present inventors have recognized problems and opportunities in the arts of systems and tools for sales tax return preparation and compliance which have not been recognized or addressed by those skilled in the art yet.

Preparing returns, filing and paying sales and use taxes can be a complicated and daunting task for small businesses, as exemplified by the long list of forms and instructions just for the jurisdiction of one state in the Background of the Invention. For example, merchants may be obligated to collect different types of sales and use taxes and prepare and file multiple forms containing different sections and schedules and then file and remit payment to one or multiple taxing authorities. Criteria that impact these variables include the type of business (retail, restaurant/bar, hotel, gas station, etc.); the types of products/services sold (food, meals, clothes, drugs, alcohol, etc.); location of the business (state, county, city, special district). The returns themselves might be filed and payment remitted to multiple distinct taxing authorities. Given that state and local taxing authorities must accommodate different lines of businesses; taxes; rules & regulations; exceptions to the standard rules, it is extremely difficult for small businesses to navigate which taxes, forms, schedules, and sections need to be filed and paid for their particular niche of the market.

Many factors come in to play when compiling and categorizing sales information for purpose of generating and filing sales tax returns. One of the main problems is that of determining which tax rates apply to any given address. Sales taxes are filed based upon where the transaction occurs. Multiple taxes can apply to any given physical location, starting from state tax rates; counties; city; and special district taxes. There are locations with up to six different tax rates that would apply to the specific address. Special district taxes can include ambulance districts; special stadium districts; special transportation districts (such as the California BART). Special District taxes do not necessarily follow city and county border lines, and might span multiple county or city tax lines and include unincorporated areas. Zip codes are not useful to determine tax rates, as ZIP codes are methods used by the US Postal Service for the delivery of mail and have no relevance upon tax boundaries (there are thousands of examples where the same zip code can have multiple, up to 6 different tax rates within the same zip code).

Another issue governing the determination of taxes is that of the taxability, determining which products are taxable, which are not, and what tax rate applies. Different products have different tax rules, and different tax rates might be used for different types of products in any given location. For example, clothing in some states might benefit from thresholds, where they are not taxed if any single unit costs less than a defined threshold. For example, in Massachusetts, any clothing item that costs less than $175 is not taxed, while those with a price that exceeds $175 per unit are taxed at regular rates. In some locations, certain items are not taxed above a certain threshold. For example, in Florida, county taxes do not apply for items that their value exceeds $5,000. In other scenarios, similar products might receive different tax treatment. For example, in many states, software downloaded through the Internet will be taxed with one rate, as an intangible service, while the very same software, with the same $Ship_{13}$ To and same Ship_From will receive a different tax treatment when delivered on a CD or DVD, because it is then treated as the delivery of a tangible product. In other scenarios, food purchased to be consumed on premise might be taxable at one rate; food to be consumed off the premises, might be taxed at a different rate and sometimes, not taxed at all.

As such, there are multiple and numerous forms that the business owner needs to navigate, with potentially hundreds of pages of instructions that cover virtually every aspect of every business type, regardless whether relevant to that of the specific business owner. These forms can and will change over time. Each form may have specific schedules and sections that may (or may not) be relevant to the merchant as well. For example, a merchant may need to file "schedule H" in New York state if they sell clothing, but does not need to file "section 401-B" in California unless they deal with farms, racehorses, timber, or telecommunications equipment. The merchant may also be required to file forms on different frequencies and periodicities, for example, being required to file quarterly to the state and monthly to the local agency. Some forms might be filed electronically, while others are paper filings that must be mailed.

In order to comply with the rules, a merchant must not only be aware to all of these nuances and distinctions, but they must also know which tax returns need to be filed, where and when. Many locations will determine the frequency of filing returns based on sales revenue. As prevalence of Internet usage is increasing, more and more states require as mandatory to file returns using electronic filing methods, however many locations do not have these capabilities, and require the mailing of a paper return with a check to cover the taxes owing. Many locations might require different types of returns to be filed, dependent upon the type of taxes. For example, a Chicago restaurant owner might be required to file a soft drink beverage tax return and a restaurant tax return in addition to their regular sales tax return filings. Hotel owners in Louisiana might be required to file the state tax return, the local Parish tax return, as well as hotel tax returns for the room occupancy. In many situations, local tax returns might have different filing frequencies than state tax returns, causing the merchant to track revenue and taxes owing to the state and local levels using different date ranges and revenue levels.

Finally, reporting the information is not straightforward as well. Each tax return requires the reporting of sales information differently. For example, Arizona requires the reporting of gross sales including sales taxes collected, and then the factoring out of taxes collected as well as tax exempt sales to determine the taxable sales, and the calculation of taxes owing. Some states require the reporting of gross total sales nationwide, while other states require the reporting of in-state sales only. Some returns do not require the inclusion of exempt sales, while others require detailed breakdown of exempt sales, by category of exemption. And then, oftentimes, local filing requirements will be different from those of state returns.

A merchant must have specific tax knowledge to be able to track all of these rules, track and implement any rule and rate change, as well as which tax return needs to be filed, when and what data elements need to be reported and how.

While there are many online systems that enable filing of returns electronically, these are mere electronic manifestations of the tax returns, requiring data to be inputted into the same data fields as in the hard print tax returns. Merchants are still required to be knowledgeable of the above referenced information to be able to complete these tax returns accurately and reliably. Given that these systems are mere manifestations of tax returns, with many data input fields that are most often extraneous fields that do not require any data input by the merchant, also prevents the generation of tax compliance tools to be used on mobile devices, where there is restricted real estate and navigation capabilities.

Some advanced compliance systems are available that can connect dynamically into the accounting and sales systems of a merchant to not only calculate taxes in real time, but to also collect sales information from the merchant accounting systems and use the information to generate and file tax returns on behalf of the merchant. However many merchants, typically small business owners, do not require and are not interested in using such systems that require significant upfront investments in time and technical resources to connect the tax system to their internal accounting systems. Many small businesses might not even use standard computerized accounting systems, rendering moot the relevance of such advanced compliance systems.

Because the logic of when to generate and file the tax returns lies with the merchant, many businesses, particularly small business owners, face the recurring issue of filing their tax returns in an untimely manner, thus having to pay significant fines and penalties for late filings.

General Overview of Embodiments of the Invention. An embodiment of the invention, dubbed the "Exactor ezFile" system for reference within this document, is designed to address these issues, and simplify the process of compiling and categorizing sales information for purpose of generating and filing tax returns, and assuring compliance with tax rules. By moving from the merchant to the filing system the logic required to determine which sales data gets reported, in which category in which return and in which fields within each return, the new system design simplifies the processes required for sales tax compliance, reduces the place for error, increases reliability and accuracy, and reduces the likelihood of having to incur fines and penalties for inaccurate tax returns. In generic terminology, one may refer to embodiments of the present invention as small business streamlined tax interface (SBSTI) systems, which provide a method that can assist a small merchant with their compliance efforts, without requiring them to purchase expensive accounting systems; connect sophisticated tax calculation engines to their electronic accounting system; or acquiring the knowledge and know how to identify, track and apply the different tax rules to their business.

The system uses account information, including the physical location of the business and the type of business (e.g. restaurant; hotel; manufacturer; service provider, etc) to determine what returns need to be filed for the merchant, and which data points to collect from the merchant, how to categorize the sales information, when to collect the sales information, all this for purpose of automatically generating and filing the tax returns for the merchant.

The system removes the logic from the merchant to the streamlined preparation system. The new system includes a logic engine that uses merchant account information, including (i) physical address of the merchant location; (ii) type of business of the merchant; (iii) type of sales (are they engaged in local sales over-the-counter compared to shipping products to other locations), and (iv) filing frequency requirements to dynamically determine whether the merchant has an obligation to file a tax return; where the merchant has the filing obligation; when the merchant has the compliance obligation and when appropriate—to prompt the merchant to provide sales information required for the filing of their tax returns via a simplified interface that is customized for the specific merchant filing requirements, that categorizes the sales information into the specific categories that are required to assure compliance with the merchant's specific filing requirements.

By moving the filing logic from the merchant to the centralized system, the new system can also be used to prompt the merchant when filing periods approach to provide their sales information, thus reducing the likelihood of incurring fines and penalties for untimely filing. By creating a system that communicates with the merchants' different computing devices, including mobile devices, such notifications can be used to prompt the merchant wherever they are, and not be restricted to only those instances where the merchant is logging in to a single certain computing device. As the notification is an integral part of the new preparation and filing system, this prompt can be used to immediately connect the merchant to the filing interface, prompting them for immediate data input.

The new system applies the above described logic to dynamically generate an input page that requires the merchant to input a limited number of clearly defined sales information, which is customized for the specific merchant.

The new preparation and filing system enables compliance from any type of device, including those with reduced real estate. Because the data input is customized and limited to only those data fields required to comply with the merchant's specific compliance requirements, meaning that a compliance input form page can be easily generated and completed on mobile devices as well as computers. Because both the logic and the data collection is removed and centralized within the Exactor system, compliance efforts can be completed in multiple phases from multiple locations. This enables a merchant to start inputting data while on one system, close in mid-session and complete the data input from a different location using a different device.

The new system is designed for those small business owners that want to simplify the process of filing sales tax returns and realize cost savings at the same time. The system attends the needs of those small business owners that do not need real time calculation of taxes on a transaction by transaction basis. The new system is designed to provide a solution for non-technical end-users who want to avoid investing in technically sophisticated, and often more difficult-to-use, solutions. Streamlined preparation and filing service reduces to a minimum the efforts required to generate and file sales tax returns; it is a service that focuses upon the back end filing of sales tax returns. It is a simplified compliance tool, intended for small brick & mortar businesses.

Intended End-Users for the Streamlined Preparation and Filing System. The end-users who will benefit from the new system will typically be merchants that want to simplify the process of filing sales tax returns and realize cost savings at the same time, such as merchants who do not need real time calculation of taxes on a transaction by transaction basis. End-users will likely be those merchants who aggregate their sales information and input at the end of the month the total sales revenue, focusing on the generating and filing of tax returns rather than real time tax calculation services.

The Generalized Process. At the beginning of each month, the end-user receives an e-mail with a URL for a unique web page. When logging to the new system's initial web page, the end-user simply inputs only the following information: (a) monthly total sales, (b) monthly taxable sales, (c) monthly non-taxable sales, and any taxes they may have collected. The new preparation and filing system then generates and files the tax return automatically, creating and filing only the return forms need by that end-user for that end-user's line of business.

Benefits of the New Streamlined Preparation and Filing Process. The new process and system provide a simple method for uploading aggregate sales information. It is designed for non-technical, unsophisticated, customers. The new service described in the present disclosure reduces the efforts required to generate and file sales tax returns, while also simplifying the payment process required by the merchant, centralizing payments that otherwise might need to be made to multiple tax agencies, using electronic payment transmissions or check payments, to a single simplified payment. This service also eliminates the need for calculating taxes on each and every transaction for small brick and mortar businesses that do not want to use real-time tax calculation services.

Figure 2:
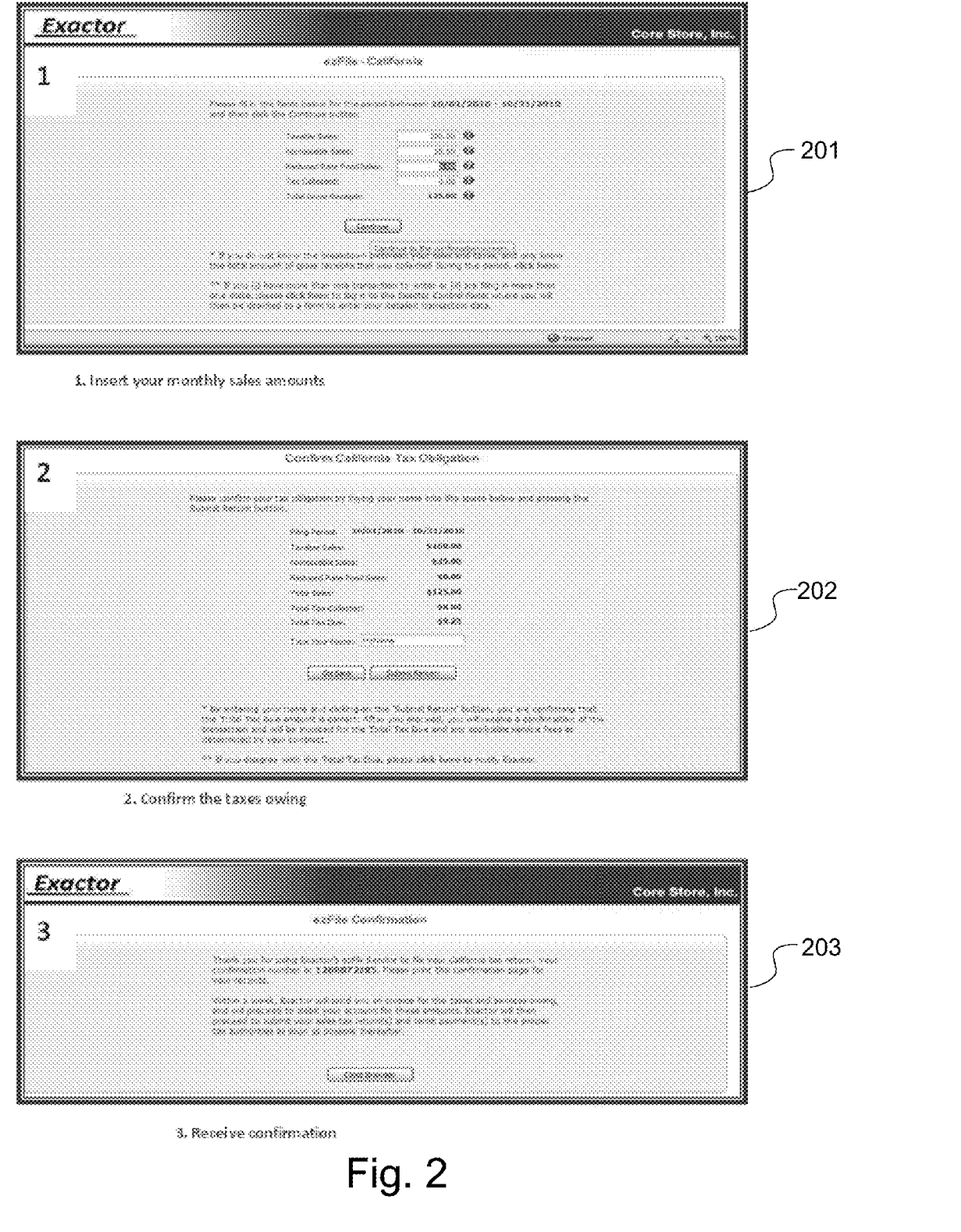
FIG. 2 illustrates three end-user interface pages for a desktop computer or larger-format display device (e.g. full size tablet computer, etc.) of the streamlined preparation process according to at least one embodiment of the present invention.

System Design Considerations. The initial end user web page will be dynamically generated for each log in by each end-user. When generated, the page is launched applying the client account parameters (account number; account name; nexus state; current month), writing transaction information into the data-base under the listed client account number. Turning now to FIG. 2, and referring to an embodiment in which the end-user interface (107) is presented to a user on a computer system having a larger-format display, such as a desktop computer or a full-size tablet computer, the initial page (201) will be launched though with static input information, specifically it is limited to:
 (i) Current month sales information only;
 (ii) Data Input:
  a. total sales;
  b. non-taxable sales;
  c. food sales; and
  d. taxes collected.

Any data fields which are not relevant to the end-user's line of business, as configured by the expert configurator, will not be shown or provided to the end-user, thereby streamlining his or her usage experience. In a second page (202), the user-provided data is reviewed, and responsive to approving the data, a third page (203) is provided to the end-user to confirm that the appropriate forms (104) were prepared and filed to a jurisdictional tax server (110).

Figure 3:
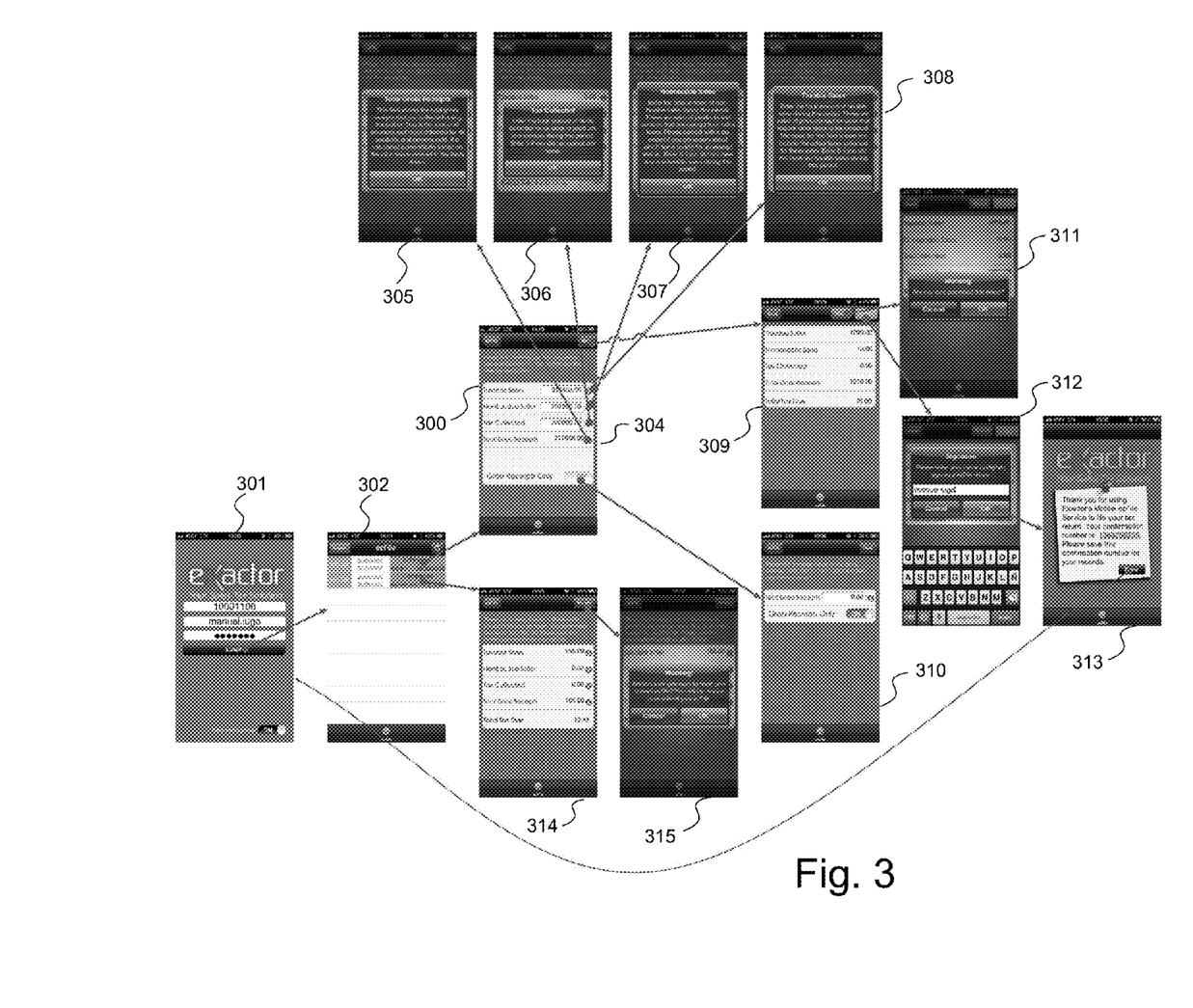
FIG. 3 depicts end-user interface pages for a mobile computing device or computer having a smaller-format display (e.g. smaller tablet computer, etc.) of the streamlined preparation process according to at least one embodiment of the present invention.

Referring to FIG. 3, corresponding screens for a first page for data input (300), a second page for data review and approval (309, 312), and a third confirmation of filing page (313) are shown, along with an optional authentication page (301), and a plurality of pop-up help pages and an account history page (305-308, 310-311, 302, and 314-315). Those skilled in the art will recognize that other embodiments of the present invention may implement a different number of pages, for example, a single page that incorporates multiple frames, or a one-step "checkout" style process with a dynamic interface.

Logical Process in General. Referring again to FIG. 1, to realize a first embodiment according to the present invention, a tax engine (102) from Exactor, Inc., may be modified and enhanced in the following manners. It is important to note that other embodiments may also be realized utilizing other tax computation engines with the following improvements and functions:
 (i) a user gateway server (a.k.a. tax preparation server) (101) may be configured to communicate with an application server running a tax computation engine ("tax engine") (102) and a suitable database (103, 104), wherein the user gateway server may be an independent web server provided with suitable application program code or integrated into the tax engine server;
 (ii) the user gateway server will be more adaptable and flexible to accommodate different and flexible client requirements without compromise of the simplified end-user experience;
 (iii) input data fields for an end-user interface (107) will be generated dynamically according to client-specific parameters;
 (iv) the user gateway server may be launched automatically from a variety of remote user platforms, such as a desk-top computers, mobile phone applications, tablet computer applications, or even from selection of universal resource locator (URL) provided in an electronic mail message (e-mail); and
 (v) remote interfaces such as an Application Programming Interface may be provided to allow business partners to integrate the user gateway server launch commands into their own proprietary platforms, thereby allowing them to co-brand or re-brand the functions of the gateway server.

Figure 1:
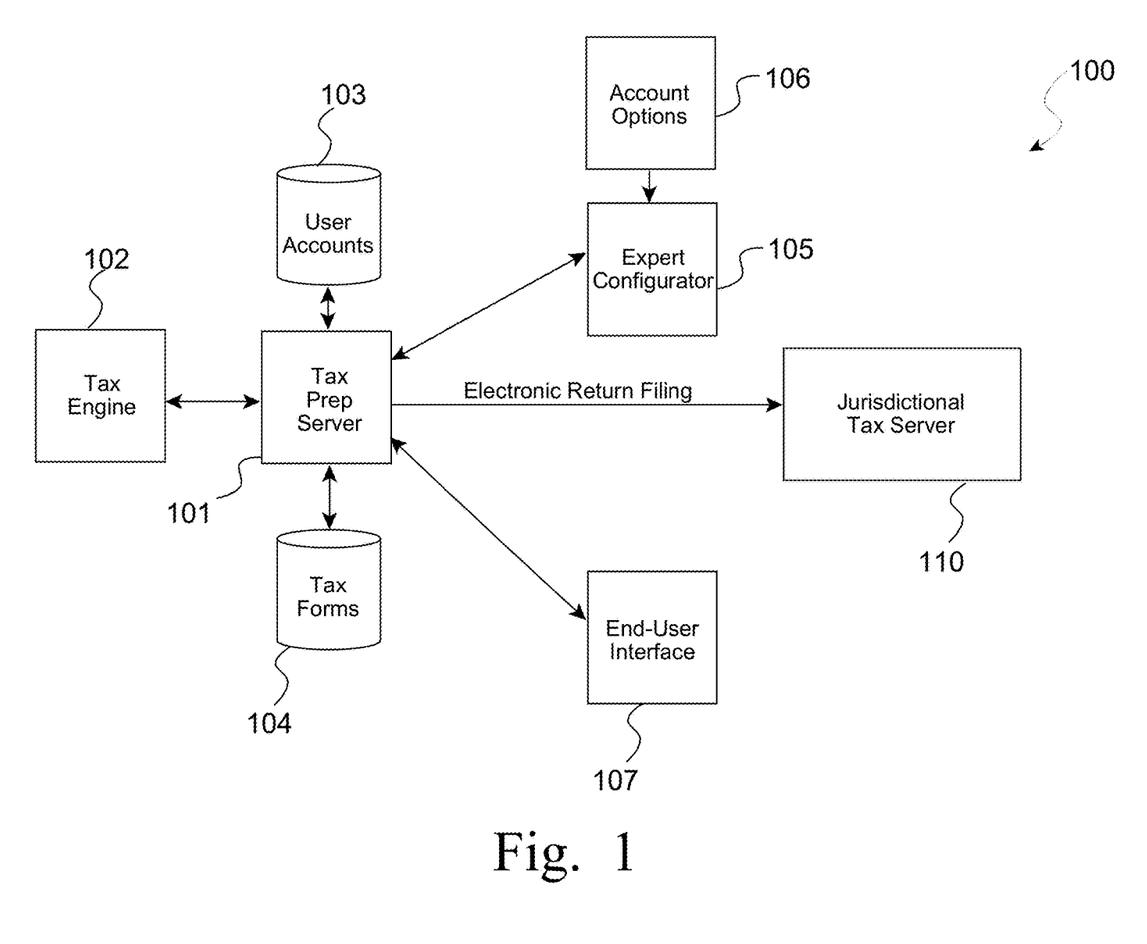
FIG. 1 provides a high-level functional diagram of an arrangement of systems according to at least one embodiment of the present invention.

In at least one embodiment, the user gateway server will provide to the end-user 3 pages (107) and at least one page to a tax expert page (105):
 1. a Landing Page, which will include the data input fields for the end-user to complete;
 2. an Approval Page, where a summary of the data input will be provided for review by the end-user;
 3. a Confirmation page, which will include a submission confirmation code; and
 4. an Account Management Page for exclusive use by a tax expert configurator (e.g. by a suitably qualified tax expert), and not for display to the end-user.

According to this embodiment, each user account (103) is flagged as an enhanced, minimized (e.g. streamlined) user interface account in the existing tax engine system's database (103), such as in the aforementioned Exactor™ Account Management system. An executable script will automate the process of updating existing Accounts data table with any account that has been flagged as an enhanced, minimized user interface account.

While such updating does not necessarily need to be performed in real time, it can be performed periodically, and preferably there is a facility provided to force an update upon Administrator command.

These specially-flagged accounts will preferably be also flagged as "reverse calculation" accounts by default to support end-users who wish to input total sales amount and have the tax amount imputed from that total sales amount to yield a portion as net sales and a portion as tax collected. Reverse calculation of taxes is a function available in many tax computation engines, and especially in the aforementioned Exactor system.

To realize the improvements and upgrades to such an existing tax system, several tables (106) may be used in the organization of the data, such as for example:

1. An Account Information Table, which preferably includes for each end-user's account:
    a. an Account number, which will be used as a unique prime key, and wherein no duplicates of this record are allowed to exist in the table;
    b. an Account name in a human-readable format (e.g. text name of the account holder);
    c. an account unique (static) URL;
    d. a user name and password pair for authentication purposes; and
    e. binary flags for business types or lines of business for this account, such as but not limited to food sales, alcohol sales, accommodations sales or rentals, and a System Override flag.
2. An Account Tax Type Universal Code (TTUC) table, which preferably includes for each end-user's account to list the all the various types of tax to be collected and submitted using TTUC's. for each account. Each record in the Account TTUC table will list a single TTUC code, preferably, and using multiple records in the table indexed to a specific account, multiple TTUC entries per account number may be recorded. For example, each TTUC record in the table may list (Account_Number, TTUC_code). A script may automate the process of updating the Accounts TTUC table with for each account that has been flagged in the Exactor system as an enhanced, minimized user interface account.
3. A Filing Confirmation Table, which will be used to create and save filing confirmations for each end-user, organized or sortable in useful ways such as by month, by tax authority, by jurisdiction, and by tax type (e.g. food, alcohol, accommodations, general merchandise, personal service, etc.). This table may be employed to prevent clients from inadvertently double filing a particular tax. Each record in this table may be represented as (Account_number, filing_period, Transaction_ID, date_time_stamp_of_filing, flag_additional_filing_allowed).
4. A Failed Transmission Table which will be used to save information about failed transaction postings. Each record in this table may be represented as (Account_Number, filing_period, date_time_stamp_of_error, <text_of_error_message_received>). In some embodiments, the Failed Transmission Table and the Filing Confirmation Table may be combined, in which case an additional field may be added to identify whether a record is a "C"onfirmation or "F"ailed transmission.
5. A Tax Type Universal Codes (TTUC) Table to hold the codes which are used within the system to denote each type of tax to be optionally processed (e.g. a complete list of all available tax type codes, a subset of which may be copied into each Account Tax Type Universal Code table for each account holder or end-user). Each record in this table may consist of:
    a. a unique-value TTUC code;
    b. a textual description of the tax type to be displayed in the web page with the matching TTUC entry for the tax expert configurator to use on the Account Management Page, but preferably this textual description is shown without showing the TTUC value to an end-user's Landing Page for data input; and
    c. a Unit calculation determination, which defaults to a percentage of revenue, but which may provide selectable options such a percentage of sales revenue and a number of units sold (number of items, number of nights, etc.).

By way of example, some TTUC values and their associated textual descriptions are shown in Table 2:

TABLE 2

Example TTUC Values and Descriptions

| Description | TTUC Value |
|---|---|
| Taxable sales | TTUC-XXXXX1 |
| Exempt sale, Sale for purpose of Resale | TTUC-XXXXX2 |
| Exempt, Sale to education institution | TTUC-XXXXX3 |
| Exempt, Sale to charitable organization | TTUC-XXXXX4 |
| Exempt, Sale to government agency | TTUC-XXXXX5 |
| Food, Taxable food (prepared food, consumed on premises) | TTUC-XXXXX6 |
| Food, Reduced rate food (prepared food consumed off premises) | TTUC-XXXXX7 |
| Food, Non-taxable food | TTUC-XXXXX8 |
| Food, Carbonated beverages | TTUC-XXXXX9 |
| Alcohol, Beer | TTUC-XXXX10 |
| Alcohol, Wine | TTUC-XXXX11 |
| Alcohol, Mixed drinks | TTUC-XXXX12 |
| . . . | |

Another structure of the data for another embodiment, for example, may be organized as such:
(1) Tax Fields Table—List of all possible fields related to collecting sales, taxes, exemptions, etc. related to all tax forms for all businesses, including:
    a. Field Code—unique code for each field;
    b. Field Description; and
    c. Field Help/instructions;
(2) Account Table—Basic information about the business, including:
    a. A unique account number to identify the customer;
    b. An account name for the business;
    c. Address information specifying the location of the business; and
    d. Business category/classification;
(3) User table—List of people eligible to file for each account, which has a foreign key relationship to account table, including fields for:
    a. Full name of each individual;
    b. Basic contact information (phone/email); and
    c. Unique username/password for credentials.
(4) Account Tax Field table—A table to track which tax fields are required for an account, which has foreign key relationships to the Tax Fields table and Account Table.

(5) Tax Return Filing table—A table to represent each return for each company for each period, which has foreign key relationships to the Account, and Account Tax Field tables, and includes fields for:
  a. Filing Period;
  b. Date Range; and
  c. Filing status (i.e. pending, completed, error, etc.).
(6) Tax Return Filing Fields table—A table to track the fields and values for each return, which has foreign key relationships to Tax Return Filing and Account Tax Field tables, and stores values for each field (i.e. gross sales amount, total tax collected amount).
(7) Eligible Filers table—A table to represent each user eligible to file specific returns, which has foreign key relationships to User table and Tax Return Filing tables, and has a unique URL for every tax return/user.

Figure 4:
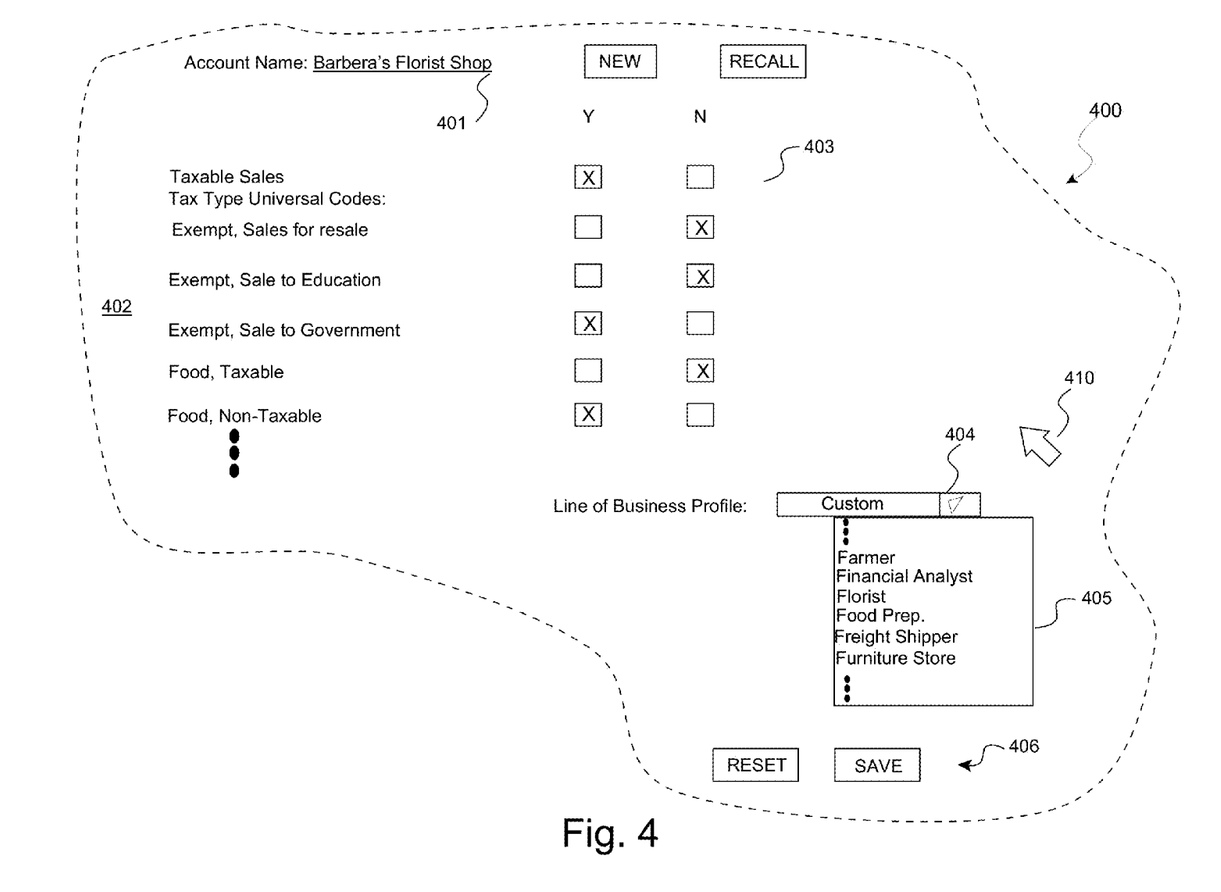
FIG. 4 provides an example expert administrator interface to configure an account and to streamline an end-user interface according to at least one embodiment of the present invention.

Account Management and Administration. Accounts will be managed from the Account Management page, intended for use only by an expert account configurator (105). Access to this page will be restricted from access by end-users. End-users will be presented the other three previously-mentioned pages in which the minimized user interface is provide. FIG. 4 illustrates an example embodiment of such an Account Management Page (400).

The Account Management landing page will consist of a list (402) of the enhanced, minimized user interface accounts. The list will be read from the Account Information table, and the page will include the Account Number and Account Name (401). Clicking (410) on the Account Number or Account Name will open the Account Management page, which will be pre-loaded with any previously-configured account options and information. The Account Management Web page may include, for example:
  1. a display of the data points that are in the Account Information table, in which toggle buttons (403) and data input editable fields will enable editing the data fields;
  2. a list (402) of enhanced, minimized user interface enabled TTUC descriptions (the TTUC code will be hidden normally), in which a toggle button will enable and disable any TTUC description for a particular enhanced account;
  3. a Save button (406) which, when operated, will enable a TTUC description and will write the TTUC code value and Account Number to the corresponding Account TTUC Table, in which disabling a TTUC description will remove the TTUC code value and Account Number from the Account TTUC Table; and
  4. a Confirmation Table lookup, preferably in the form of a drop-down menu listing filing periods by year or month, will be displayed showing date of a particular filing, optionally matching a selected filing period, and will preferably include a toggle button to enable "allow an additional filing", this toggle button preferably having a default condition of disabled, and when toggled, the "allow additional filing" flag in the Filing Confirmation table will be changed to "Y".

Further, and optionally, a number of pre-configured Line of Business profile (404) may be provided such that the expert configurator can quickly load selections (403), and then edit them as desired. Additionally, an artificial intelligence engine may monitor one or more expert configurators, and when a pattern of common configuration is detected, a new Line of Business profile may be proposed and saved to the list (405).

Methods For Launching the Service. The end-user Landing page will be launched from any one or more of the following options:
  1. a URL that will be mailed out to end-users each month, which when activated, will automatically redirect or point a browser or other user interface program (e.g. custom application, thin client, etc.) to a unique web page which is dynamically generated for the specific user's account;
  2. a Desktop launch application program which will launch the Landing web page on the first calendar day of each month, such as by the Desktop application program querying the Filing Confirmation Table periodically (e.g. once per day), and if no entry exists that confirms filing of a tax return in the given filing period, the launch application will re-launch a daily filing reminder, and if an entry exists confirming filing of an tax return in the given month, the launch application will discontinue operations until the next calendar month;
  3. a Mobile phone launch application program ("App") launch application which will retrieve the Landing web page on the first calendar day of each month, such as by querying the Filing Confirmation Table periodically (e.g. once per day), and if no entry exists that confirms filing of a tax return in the given filing period, the mobile app will re-launch a daily filing reminder, and if an entry exists confirming filing of a tax return in the given month, the mobile app will discontinue operations until the next calendar month; and
  4. an application programming interface (API) or remote procedure call will be provided that will enable the integration of an embodiment of the present invention with third party platforms.

Launch information stored in the launch apps may include the client unique URL, in an encrypted format. To complete the launch process, the user may, in some embodiments, be required to input their user name and password. Localized cookies may be used to locally store a user name.

The mailed URL based launch will not require password authentication in some embodiments for further streamlining Preferably for other launch methods, the user's password will not be stored locally, and the user will be required to input the password upon each log-in attempt. The user will be locked out after 3 unsuccessful log-in attempts, and customary options to recover a forgotten password will be provided, as well as an option to reset a password. Reset passwords will be mailed to the e-mail account of the user of record, for example.

Verification. Prior to launching the Landing page, the system will preferably perform an account verification against the Account Information Table, confirming the (a) Account number, (b) User name, and (c) Filing Confirmation. For (c), the "Allow additional filing" flag will, in at least one embodiment, be interpreted to mean a flag that determines whether an authorized user may submit information only once for a certain account in a certain filing period or whether the system will allow an authorized user or multiple authorized users of the same account to submit filing information for a certain filing period in multiple sessions. If streamlined preparation has been completed for the account and "allow multiple filings" flag is set to "Y" for any filing period, or if streamlined preparation has not been completed for the account and the same filing period and there is no entry in Filing Confirmation Table for the current filing period, the system will preferably proceed to launch the Landing Page. However, if streamlined preparation has been completed for the same account, AND "allow multiple filings" flag is set to "N" for all filing periods, a message to the end-user will be provided such as:

"A streamlined preparation has already been completed for your account for this filing period. Our records indicate that only one filing is allowed per filing period for this account or type of tax. No further action is required. Please contact your account rep if this has been done in error, or you otherwise need to update your filing."

Streamlined Preparation Landing Web Page. The preparation landing page of the exemplary embodiment has the following input fields or options for the en-user to complete or operate.

A data input page may, in some embodiments, be pre-populated with data from other tables and resources. For example, a particular embodiment might be connected to a separate and distinct payment processing system, so that when the data input page is generated it will include payments previously processed during the relevant time period. Pre-populated data fields might be optionally overriden by the end-user. For example, if the data input field is pre-populated with sales revenue received from a separate and distinct payment processing system, but the merchant has additional cash receipts, the end-user might add these additional cash receipts to the total sales revenue before proceeding to the next step.

The Filing Period will include the current month as the default filing period. Transactions will be written for the last calendar day of the prior month. So, for example, if the system is launched on August $4^{th}$, it will write a transaction using July $31^{st}$ as the commit and sale date. The landing page will enable writing to prior periods if the user elects, such as via a drop-down menu. Error messages may be received from the preparation system that prevents a user from writing to a prior period. Most typical will be a situation where the client has already filed a return in a prior period, and the preparation system will prevent making changes to such prior periods. In the event that an error message is generated, a message will be generated to the user to contact their account rep to enable their account to write to a prior period in such a situation.

The data input landing web page will be configured for mobile app usage as well. This could include breaking the input fields into multiple entry pages configured for the device resolution.

A Reverse Calculation option (button, check box, etc.) will be enabled by default, and shown in the data input page. A "Tax Collected" field will be invisible as long as this button is enabled. Transactions will be performed as Reverse Calculation. Unchecking the Reverse Calculation button (may be marked as Sales Revenue includes taxes collected button) will result in (a) a Tax Collected field being displayed for input, and (b) the transaction will be performed as regular "forward" calculation.

Data Input Fields will include fields that are generic for all user accounts, as well as each of the additional Input Data Fields that are associated with the given account. More specifically, the following input data fields will be included with each ezFile web page: (a) Taxable Sales (no TTUC code), (b) Non-taxable Sales (preferably a drop-down menu include options for Sale for purpose of Resale, Sale to education institution, Sale to charitable organization, Sale to government agency, and Miscellaneous exemption); (c) Food (Taxable food, Reduced rate food, Non-taxable food, Carbonated beverages, etc.), (d) Alcohol (Beer, Wine, Mixed drinks, etc.), and (e) Accommodation (Accommodation revenue, Number of rooms in hotel, Number of room nights rented), (f) Taxes Collected (invisible by default, and displayed if the "Revenue includes tax" option is disabled).

A Continue button will be placed on the bottom of the page in the exemplary embodiment. Once the end-user inputs all of their data, they will press the "Continue" button to move them to the "Approval Page"

The end-user will be provided an Approval page responsive to selecting the Continue button on the data input Landing page. The Approval page will include all of the data input in non-editable format. Here, the end-user will be asked to review the collected data, and to approve the filing by typing in their name. Two Proceed buttons will be available at the bottom of the page. First, a Return and Edit button will be always active, and operating it will return the user to the data input Landing page, where the Landing page may be pre-populated with previously data input as previously described. Second, an Approve and Submit button will be provided, normally greyed out, but it will become active once data is input into the Type Name field. Operating the Approve and Submit button will (i) submit the transaction to the data preparation system; and (ii) move the end-user to the Confirmation page.

On the Confirmation page, which is served to the end-user responsive to operation of the Approve and Submit button, a Confirmation number will be generated from the Transaction ID received in the Transaction Response of the preparation system submitting the prepared tax return to the jurisdictional server. The Confirmation page will include an error message(s) if the Approval transaction resulted in a failed transaction posting to the jurisdictional tax collection system. Failed messages will be written and saved in the Failed Transmission Table. No other variable information will be displayed in the confirmation page (no tax data) according to this exemplary embodiment.

Figure 5:
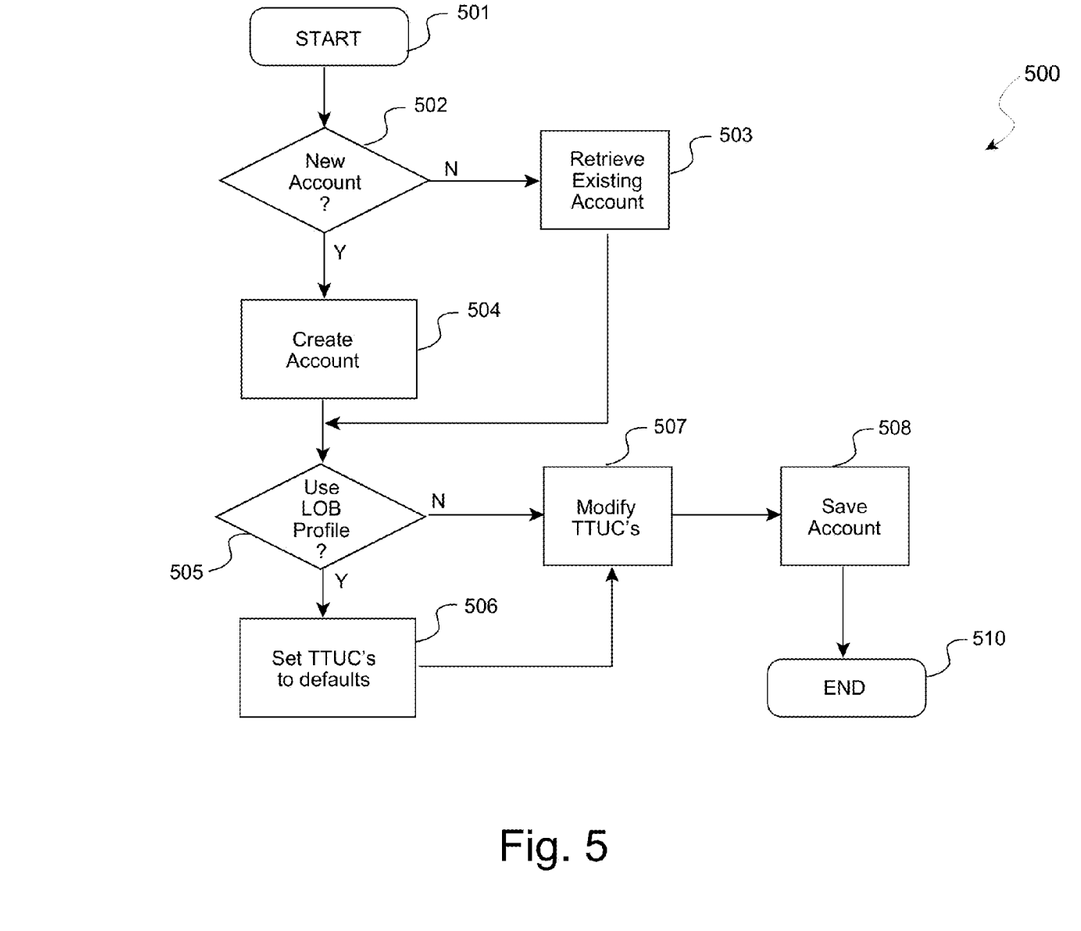
FIG. 5 sets forth a logical process suitable for realization as a combination of application programming instructions and computing electronics hardware.

Example Logical Process. Referring to FIG. 5, an example logical process for the expert configurator according to the present invention is shown, which may be realized in part or whole as computer program instructions and a processor for execution, customized electronic circuits, or a combination of program, processor and circuits.

The example process (500) starts (501) by determining (502) if a selected account is new or not. If it is not new, then the existing account is retrieved (503) such as from the Accounts Database. If it is new, then the new account is created (504), such as by retrieving a Line of Business profile (505, 506) or individually selecting (507) TTUC codes as shown in FIG. 4. Finally, the new (or modified) account is saved (508, 510), such as storing in an Accounts Database.

Suitable Computing Platform. The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 6:
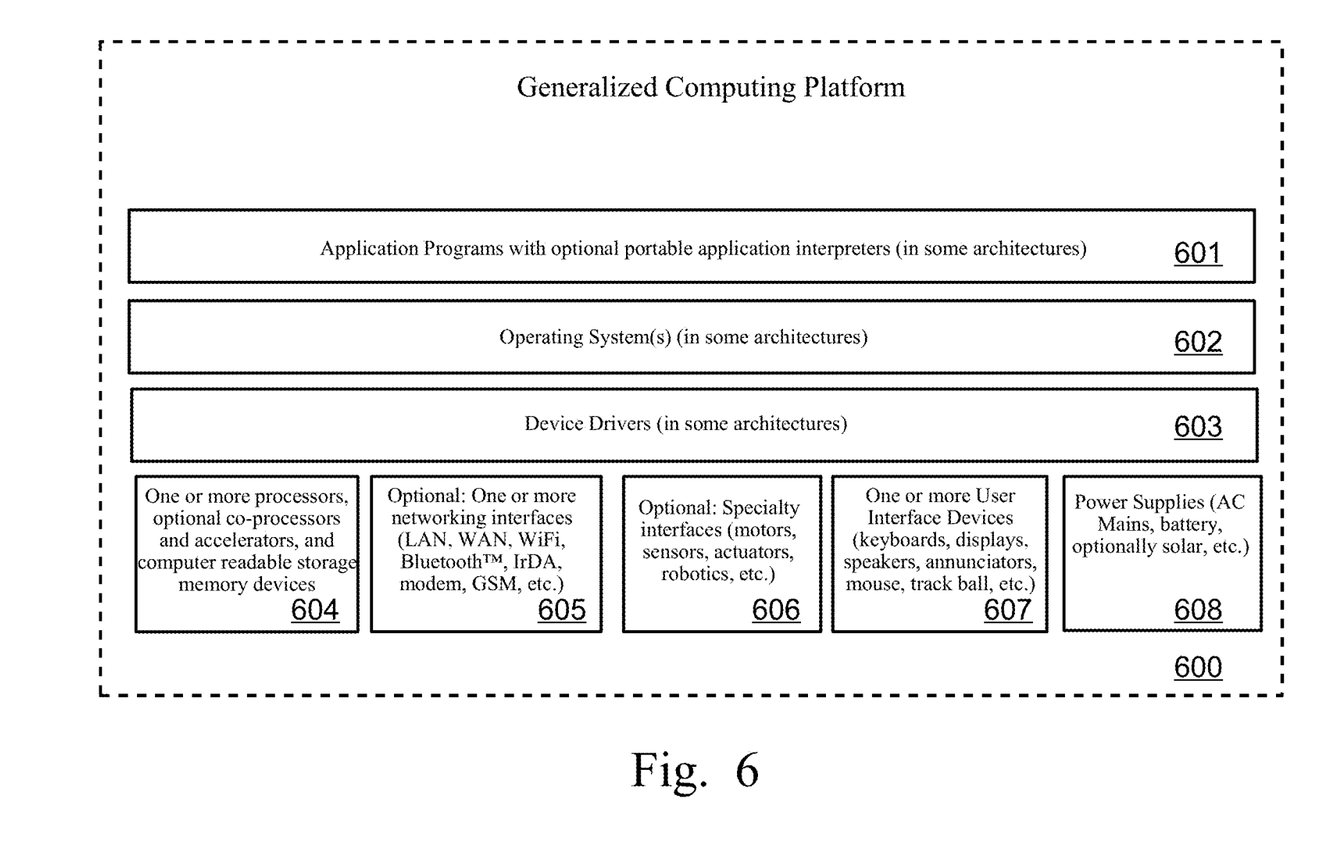
FIG. 6 depicts a generalized view of a computing platform as used in an embodiment of the invention.

The present invention may be realized for many different processors used in many different computing platforms. FIG. 6 illustrates a generalized computing platform (600), such as common and well-known computing platforms such as "Personal Computers", web servers computers, and portable computing devices (e.g. personal digital assistants, smart phones, tablet computers, etc.), running a suitable operating system (602) (e.g. Microsoft™ Windows™, IBM™ AIX™, UNIX, LINUX, Google Android™, Apple iPhone iOS™, etc.), may be employed to execute one or more application programs to accomplish the computerized methods described herein. Whereas these computing platforms and operating systems are well known and publicly described in a number of textbooks, websites, and "open" specifications and recommendations, the diagrams and further details of these computing systems in general (without the customized logical processes of the present invention) are readily available to those ordinarily skilled in the art.

Many such computing platforms, but not all, allow for the addition of or installation of application programs (601) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (604) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (605) may be provided, as well as specialty interfaces for specific applications. If the computing platform is intended to interact with human users, it is provided with one or more user interface devices (607), such as display(s), keyboards, pointing devices, speakers, etc. And, each computing platform requires one or more power supplies (battery, AC mains, solar, etc.).

Alternative Input Methods. While the foregoing example embodiments referred generally to visual user interfaces, such as computer screens, touch screens, and the like, optional embodiments may include, separately or combined with visual inputs, voice and telephonic input methods. For example, each of the input fields may be presented as a voice prompt, and the end-user may response by telephone keypad (e.g. Dual Tone Multi-Frequency or "DTMF") or by speaking a response into a microphone. For the former response, a DTMF decoder may be employed to detect digits and codes (e.g. "#" to end the entry, "*" to repeat the prompt, etc.). For the latter response, a voice recognition resource may be employed to detect digits, amounts, units, and system commands.

Conclusion. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for providing a streamlined user interface on a computing device, comprising:

accessing in computer-readable memory by a tax preparation server computer a plurality of system-wide table of tax type universal codes;

disposing in a record in a database, via an authenticated account management user computer interface, one or more enabled tax type universal codes, wherein the enabled tax type universal codes are a unique subset of the plurality of system-wide table of tax type universal codes, wherein the record is associated with a specific end-user, and wherein each enabled tax type universal code corresponds to one or more jurisdiction-specific tax report sections, tax schedules, or both, according to a compliance tax jurisdiction for the specific end-user;

subsequently, generating, by the tax preparation server computer, a unique web form that does not replicate a tax filing form for the compliance tax jurisdiction on a user interface of a computing device in use by the specific end-user, the unique web form having first input fields prompting the specific end-user to input only aggregated sales data values corresponding to each of the one or more enabled tax type universal codes according to the record in the database and suppressing presentation of second input fields for reception of input data values excluded from the unique subset of the plurality of system-wide table of tax type universal codes, thereby reducing display space required on the computing device;

receiving, by the tax preparation server computer via the first input fields, one or more input aggregated sales data values from the computing device; and preparing, by the tax preparation server computer, an electronic sales tax return using the received one or more input aggregated sales data values according to one or more rules of the compliance tax jurisdiction which apply to the specific end-user, and by associating the received one or more input aggregated sales data values with jurisdiction-specific tax report sections or schedules corresponding to the enabled tax type universal codes in the record in the database, wherein the specific end-user is prevented from authenticating as an account management user.

2. The method as set forth in claim 1, wherein the unique web form comprises a web page.

3. The method as set forth in claim 1, wherein the unique web form is generated in response to input from an application program.

4. The method as set forth in claim 3 wherein the application program is a mobile application.

5. The method as set forth in claim 1, wherein the unique web form comprises an Application Programming Interface.

6. The method as set forth in claim 1, further comprising:
authenticating, by the tax preparation server computer, an administrator user; and
after authenticating the administrator user, generating by the tax preparation server computer an account management input page on a user interface of a computing device in use by the administrator user, wherein:
the account management input page presents one or more enabled tax type universal codes that can be disabled by the administrator user, and one or more disabled tax type universal codes that can be enabled by the administrator user;
the unique web form and the account management input page are separate and distinct from each other; and
display of the account management input page to the specific end-user is prevented.

7. The method as set forth in claim 6, further comprising generating, by the tax preparation server computer, one or more selectable lines of business profiles on the account management input page that, when selected by the administrator user, cause the tax preparation server computer to enable and disable the tax type universal codes in a predetermined configuration.

8. The method as set forth in claim 1, wherein enabled and disabled tax type universal code definitions are stored in a user account record associated with the specific end-user.

9. The method as set forth in claim 1, wherein the computing device is a mobile device.

10. The method as set forth in claim 1, wherein the unique web form is generated at each filing period associated with the compliance tax jurisdiction.

11. The method as set forth in claim 10, further comprising electronically filing the tax return by the tax preparation server computer to a jurisdictional tax server.

12. The method as set forth in claim 11, further comprising submitting a tax payment by the tax preparation server computer to a payment processing service corresponding to a value due in the tax return.

13. The method as set forth in claim 1, wherein the first input fields comprise one or more input prompts selected from the group consisting of a web form field and a voice prompt, and wherein the one or more to input aggregated sales data values received from the first input fields comprises one or more data values received from the group consisting of a typed value, an input from a handwriting recognizer, an input from a telephone dialing code recognizer, and an input from a voice recognizer.

14. A computer program product comprising:
one or more tangible computer memory devices; and
program instructions encoded by the one or more tangible computer memory devices for causing a tax preparation server computer to perform an operation for providing a streamlined user interface on a computing device, the operation comprising:
accessing in computer-readable memory a plurality of system-wide table of tax type universal codes;
disposing in a record in a database, via an authenticated account management user computer interface, one or more enabled tax type universal codes, wherein the enabled tax type universal codes are a unique subset of the plurality of system-wide table of tax type universal codes, wherein the record is associated with a specific end-user, and wherein each enabled tax type universal code corresponds to one or more jurisdiction-specific tax report sections, tax schedules, or both, according to a compliance tax jurisdiction for the specific end user;
subsequently, generating a unique web form that does not replicate a tax filing form for the compliance tax jurisdiction on a user interface of a computing device in use by the specific end-user, the unique wed form having first input fields prompting the specific end-user to input only aggregated sales data values corresponding to each of the one or more enabled tax type universal codes according to the record in the database and suppressing presentation of second input fields for reception of input data values excluded from the unique subset of the plurality of system-wide table of tax type universal codes, thereby reducing display space required on the computing device,
receiving one or more input aggregated sales data values via the first input fields from the computing device; and
preparing an electronic sales tax return using the received one or more input aggregated sales data values according to one or more rules of the compliance tax jurisdiction which apply to the specific end-user, and by associating the received one or more input aggregated sales data values with jurisdiction-specific tax report sections or schedules corresponding to the enabled tax type universal codes in the record in the database,
wherein the end-user is prevented from authenticating as an account management user.

15. The computer program product as set forth in claim 14, wherein the operation further comprises:
authenticating an administrator user; and
after authenticating the administrator user, generating an account management input page on a user interface of a computing device in use by the administrator user, wherein:
the account management input page presents one or more enabled tax type universal codes that can be disabled by the administrator user, and one or more disable tax type universal codes that can be enabled by the administrator user;
the unique wed form and the account management input page are separate and district from each other; and
display of the account management input page to the specific end-user is prevented.

16. The computer program product as set forth in claim 15, wherein the operation further comprises:
generating one or more selectable lines of business profiles profiles on the account management input page that, when selected by the administrator user, causes the tax preparation server computer to enable and disable the tax type universal codes in a predetermined configuration.

17. The computer program product as set forth in claim 14, wherein the first input fields comprise one or more input prompts selected from the group consisting of a web form field and a voice prompt.

18. A system comprising:
 a tax preparation server computer having a processor for performing logical operations;
 one or more tangible computer memory devices accessible by the processor; and
 program instructions encoded by the one or more tangible computer memory devices for causing the tax preparation server computer to perform an operation for providing a streamlined user interface on a computing device, the operation comprising:
  accessing in computer-readable memory a plurality of system-wide table of tax type universal codes;
  disposing in a record in a database, via an authenticated account management user computer interface, one or more enabled tax type universal codes, wherein the enabled tax type universal codes are a unique subset of the plurality of system-wide table of tax type universal codes, wherein the record is associated with a specific end-user, and wherein each enabled tax type universal code corresponds to one or more jurisdiction-specific tax report sections, tax schedules, or both, according to a compliance tax jurisdiction for the specific end-user;
  subsequently, generating a unique web form that does not replicate a tax filing form for the compliance tax jurisdiction on a user interface of a computing device in use by the specific end-user, the unique web form having first input fields prompting the specific end-user to input only aggregated sales data values corresponding to each of the one or more enabled tax type universal codes according to the record in the database and suppressing presentation of second input fields for reception of input data values excluded from the unique subset of the plurality of system-wide table of tax type universal codes, thereby reducing display space required on the computing device;
  receiving one or more input aggregated sales data values via the first input fields from the computing device; and
  preparing an electronic sales tax return using the received one or more input aggregated sales data values according to one or more rules of the compliance tax jurisdiction which apply to the specific end-user, and by associating the received one or more input aggregated sales data values with jurisdiction-specific tax report sections or schedules corresponding to the enabled tax type universal codes in the record in the database, wherein the end-user is prevented from authenticating as an account management user.

19. The system as set forth in Claim 18, wherein the operation further comprises:
 authenticating an administrator user; and
 after authenticating the administrator user, generating an account management input page on a user interface of a computing device in use by the administrator user, wherein:
  the account management input page presents one or more enabled tax type universal codes that can be disable by the administrator user, and one or more disable tax type universal codes that can be enabled by the administrator user;
  the unique web form and the account management input page are separate and distinct from each other; and
  display of the account management input page to the specific end-user is prevented.

20. The system as set forth in claim 19, wherein the operation further comprises:
 generating one or more selectable lines of business profiles on the account management input page that, when selected by the administrator user, causes the tax preparation server computer to enable and disable the tax type universal codes in a predetermined configuration.

* * * * *